United States Patent
Lee

(10) Patent No.: US 9,494,184 B1
(45) Date of Patent: Nov. 15, 2016

(54) RAIL-TYPE VACUUM FIXER

(71) Applicant: GOODSENSE CO., LTD., Goyang (KR)

(72) Inventor: Kye-Yoon Lee, Goyang (KR)

(73) Assignee: GOODSENSE CO., LTD., Goyang-Si (KR)

( * ) Notice: Subject to any disclaimer, the term of this patent is extended or adjusted under 35 U.S.C. 154(b) by 0 days.

(21) Appl. No.: 14/735,240

(22) Filed: Jun. 10, 2015

(51) Int. Cl.
*A45D 42/14* (2006.01)
*F16B 47/00* (2006.01)
*F16M 13/02* (2006.01)

(52) U.S. Cl.
CPC ............. *F16B 47/00* (2013.01); *F16B 47/003* (2013.01); *F16M 13/022* (2013.01)

(58) Field of Classification Search
CPC .............................. F16B 47/006; Y10S 292/28
USPC ......... 248/205.5, 205.8, 683, 690, 304, 339, 248/205.3, 205.7, 206.2, 309.3, 467
See application file for complete search history.

(56) References Cited

U.S. PATENT DOCUMENTS

| | | | | |
|---|---|---|---|---|
| 2,940,713 A * | 6/1960 | Van Dusen | ............. | F16B 47/00 248/205.1 |
| 2,968,460 A * | 1/1961 | Van Dusen | ............. | F16B 47/00 248/205.3 |
| 3,240,461 A * | 3/1966 | Singleton | ................ | F16B 47/00 248/205.8 |
| 4,133,575 A * | 1/1979 | Mader | ........................ | B60J 1/20 248/205.8 |
| 6,045,111 A * | 4/2000 | Hsieh | ...................... | F16B 47/00 248/205.8 |
| 6,895,642 B2 * | 5/2005 | Huang | ..................... | A47G 1/17 24/303 |
| 6,896,228 B1 * | 5/2005 | Lu | .......................... | A47K 3/003 211/105.1 |
| 6,932,306 B2 * | 8/2005 | Zou | .......................... | F16B 47/00 248/205.5 |
| 8,087,625 B2 * | 1/2012 | Chang | ..................... | F16B 47/00 248/205.5 |
| 8,132,766 B2 * | 3/2012 | Tooley | ..................... | A47K 5/18 248/205.5 |
| 8,292,253 B2 * | 10/2012 | Zhadanov | ................ | A47K 5/04 248/205.3 |
| 2002/0175250 A1 * | 11/2002 | Lian | ........................ | F16B 47/00 248/205.5 |
| 2002/0190170 A1 * | 12/2002 | Ting | ........................ | F16B 47/00 248/205.5 |
| 2006/0249638 A1 * | 11/2006 | Ehrke | .................... | A47K 3/281 248/205.5 |

(Continued)

FOREIGN PATENT DOCUMENTS

| | | |
|---|---|---|
| JP | S5338857 | 4/1978 |
| KR | 20-0233533 | 5/2001 |
| WO | 2005/035999 | 4/2005 |

*Primary Examiner* — Terrell McKinnon
*Assistant Examiner* — Michael McDuffie
(74) *Attorney, Agent, or Firm* — Lex IP Meister, PLLC

(57) ABSTRACT

The present invention relates to a rail-type vacuum fixer, and more specifically relates to the rail-type vacuum fixer with a two-piece structure composed of a suction plate, on which a screw bar is installed at the center of the top surface and a hard rotary rail is installed in the circumferential direction in the areas of the top surface, and a rotary cap, which has a screw pipe inserted by the said screw bar at the center of the inside and is equipped in the border area with a sliding rim corresponding to the said rotary rail.

8 Claims, 4 Drawing Sheets

(56) References Cited

U.S. PATENT DOCUMENTS

| 2009/0057510 A1* | 3/2009 | Orban | F16B 47/00 248/205.4 |
| 2013/0200237 A1* | 8/2013 | Park | A47G 1/17 248/304 |
| 2014/0374553 A1* | 12/2014 | Park | F16B 47/00 248/205.5 |

* cited by examiner

RAIL-TYPE VACUUM FIXER

BACKGROUND OF THE INVENTION (a) Field of the Invention

The present invention relates to a rail-type vacuum fixer, and more specifically relates to the rail-type vacuum fixer with a two-piece structure composed of a suction plate, on which a screw bar is installed at the center of the top surface and a hard rotary rail is installed in the circumferential direction in the areas of the top surface, and a rotary cap, which has a screw pipe inserted by the said screw bar at the center of the inside and is equipped in the border area with a sliding rim corresponding to the said rotary rail.

(b) Description of the Related Art

The rail-type vacuum fixer is a household item to simply attach towel hangers or soap cases to mirrors or tile walls by using a soft suction plate like an octopus sucker. It is very convenient since it is easy to change the attachment position depending on the need and no attachment trace is left. The vacuum fixers with a variety of structures have been developed in the past. They may be divided into one piece type, two-piece type, and three-piece type depending on the number of major components related to suction power generators.

First of all, the one-piece type vacuum fixer has the most primitive structure and is composed only of one elastic suction plate with a dented bottom structure. The suction force is generated by the force of shape restitution for the said suction plate itself. This one-piece type has an advantage that its structure is simple, its manufacturing cost is low, and it is simple to use, but it has also a disadvantage that its use is limited since its suction force is very weak.

Attached FIG. 1 illustrates the ordinary two-piece type vacuum fixer composed of the suction plate (10), the pressing cap (20), and the fastener (30). The said suction plate (10) is soft and has the screw bar (11) installed on the top surface. The flat bottom surface is sealed to the attached surface (S). The said pressing cap (20) covers the said suction plate (10) and the said screw bar (11) penetrates through the center. The said fastener (30) is installed on the screw bar (11) protruded over the said pressing cap (20) and pulls the said screw bar (11). In the said FIG. 1, the said fastener (30) is illustrated foe convenience in the screw form. However, the said fastener (30) may be constructed in the form of a lever based on the principle of leverage.

The three-piece vacuum fixer mentioned above is forced to raise the said screw bar (11) in order to expand the volume of the vacuum space (C). In this process, while the border area of the suction plate (10) is pulled over toward the center, the state of sealing between the suction plate (10) and the attached surface (S) is disturbed, and this phenomenon eventually worsen the air-tightness of the vacuum chamber (C).

In order to compensate this problem, in the International Public Patent TO2005-35999 (2005 Apr. 21), this applicant proposed a vacuum fixer in which a gel-type polyurethane vacuum wall is installed on the bottom surface of the pressing plate. The said fixer maintains an excellent suction endurance since the sticky vacuum wall covers the border area of the suction plate and then improves the air-tightness of the vacuum chamber (C).

Meanwhile, the attached FIG. 2(a) shows a two-piece vacuum fixer, composed of a cap (1) and the suction plate (5), which was introduced in Korean Utility-Model Registration No. 20-0233533 (2001 May 28). The said suction plate (5) has the male screw part (7) installed on the top surface, and the said cap (1) is equipped with the pressing chin (2), which presses and supports the border area of the said suction plate (5), and the female screw part (3), which is tightened with the said male screw part (7). Therefore, if the said cap (1) is rotated, the vacuum chamber is formed at the bottom surface of the suction plate (5) while the said male screw part (7) rises into the female screw part (3). At the bottom of the said cap (1), installed is the hook (4) to hang other objects.

Besides, in Japanese Public Patent No. 53-38857 (1978 Apr. 10), as shown in Attached FIG. 2(b), introduced is a two-piece type vacuum fixer composed of the sucker (1) and the hard cup (3). On the said sucker (1), formed is the rail for prevention of shrinkage (2). Reference numeral 4 is a cup rim.

SUMMARY OF THE INVENTION

Since the said cap (1) of the two-piece type vacuum fixer with a structure shown in the said FIG. 2(a) conducts the dual functions of the pressing cap (20) and fastener (30) of the three-piece type vacuum fixer, it has an advantage that it has a simpler structure and a lower manufacturing cost than the three-piece type vacuum fixer. In order to expand the volume of the vacuum chamber (C), however, the male screw part (7) should be forced to rise just like the three-piece type. In this process, if the border area of the suction plate (5) is pulled to rise after the male screw part (7), the air-tightness of the vacuum chamber tends to decrease.

In addition, in case of the two-piece type vacuum fixer shown in Attached FIG. 2(b), the said rail (2) is expected to be effective in preventing the shrinkage of the soft sucker (1). However, since the said cap (3) is in direct contact with the top surface of the said soft sucker (1), the said soft sucker (1) interferes with the rotation of the said cap (3). Thus, when the said cap (3) rotates, the said sucker (1) also rotates little by little with the said cap (3), which eventually causes the sealing state between the attached surface (S) and the sucker (1) to be disturbed.

In this way, though the traditional two-piece vacuum fixer has a simpler structure than that of the three-piece vacuum fixer, it has a problem that the suction force is remarkably lower. The objective of the present invention is just to solve this technical task.

The rail-type vacuum fixer based on the present invention is characteristic in that it is composed of a soft suction plate, which has a screw bar installed at the center of the top surface and a hard rotary rail installed in the circumferential direction in the outer area of the top surface, and a hard rotary cap, which covers the top surface of the said suction plate, has a screw pipe formed for insertion of the said screw bar at the center of the inside, and is equipped, in the border area, with a sliding rim corresponding to the said rotary rail; and on the said rotary rail, deployed is a flat circular gliding plane developed in the horizontal direction on the cone with the said screw bar as a center.

Thus, it is characteristic in that if the said rotary cap is rotated, the said screw bar rises into the said screw pipe while the bottom surface of the said sliding rim slides along the said gliding plane.

The rail-type vacuum fixer based on the present invention is composed of the two pieces of a suction plate and a rotary cap and so it has a simpler structure than the conventional three-piece type and is effective in saving the manufacturing cost.

In addition, the rail-type vacuum fixer based on the present invention prevents the deformation of the suction plate and disperses the load imposed upon the suction plate since the said rotary rail decreases the friction force between the suction plate and the rotary cap, which makes the rail-type vacuum fixer effective in improving the suction force and suction endurance in comparison with not only the conventional two-piece type but also the three-piece type.

In addition, the rail-type vacuum fixer based on the present invention has no structure corresponding to the fastener of the three-piece structure, which enables the change of the structure of the said rotary cap in various ways and especially makes it effective to fabricate a vacuum fixer with a low-height and flat structure.

DETAILED DESCRIPTION OF THE EMBODIMENTS

Figure 1:
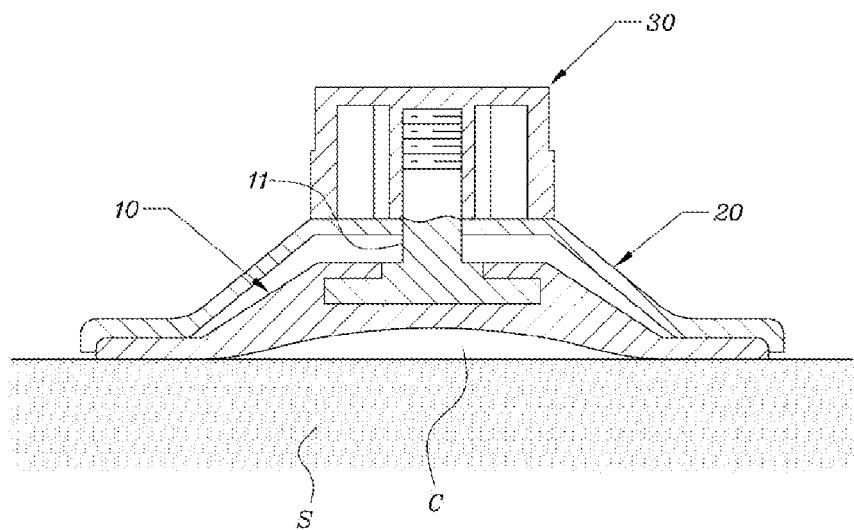
FIG. 1 shows the structure of the conventional three-piece vacuum fixer.
Figure 2A:
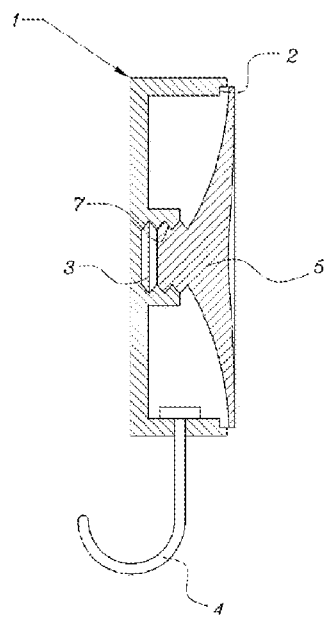
FIG. 2A, 2B show a case of the conventional two-piece type vacuum fixer.
Figure 2B:
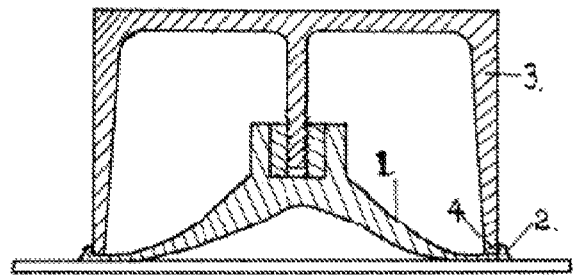

Hereunder, the present invention is described in detail by using the attached figures. However, in FIGS. 3 through 6 for description of the present invention, an independent name and figure number are assigned to each component regardless of FIGS. 1 and 2 for introduction of the conventional technology. And the attached FIGS. 3 through 6 introduce the Examples for easier description of the present invention. Thus, the scope of protection for the present invention is not limited by the Examples.

Figure 3:
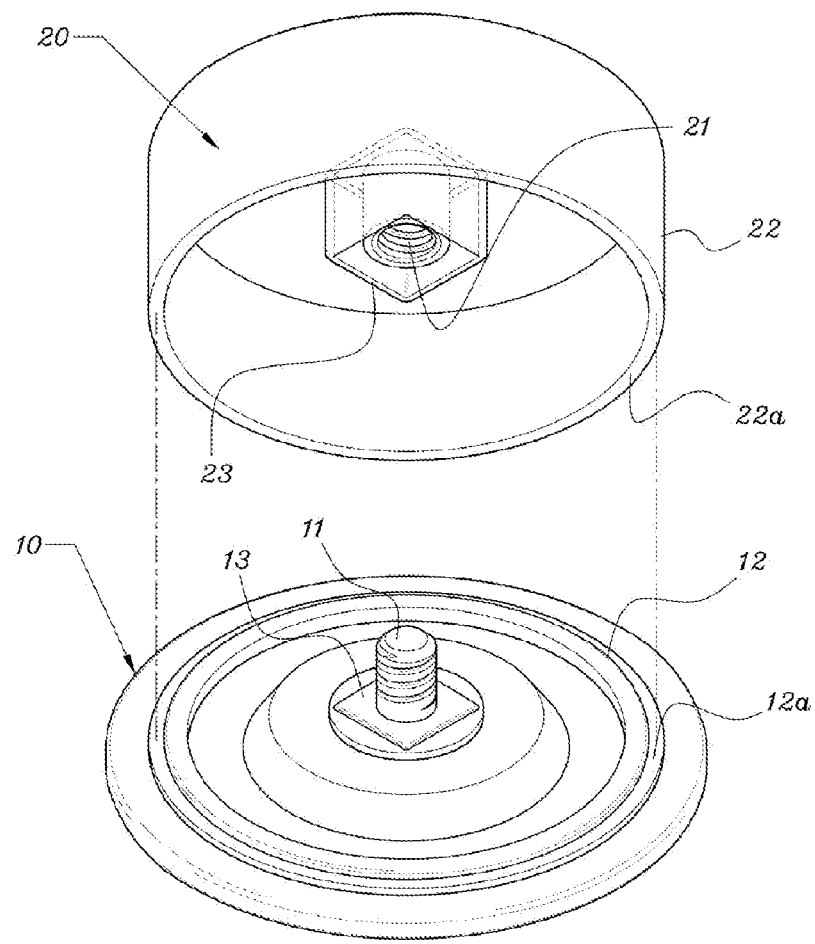
FIG. 3 shows the separated perspective view of the rail-type vacuum fixer based on the present invention.
Figure 4:
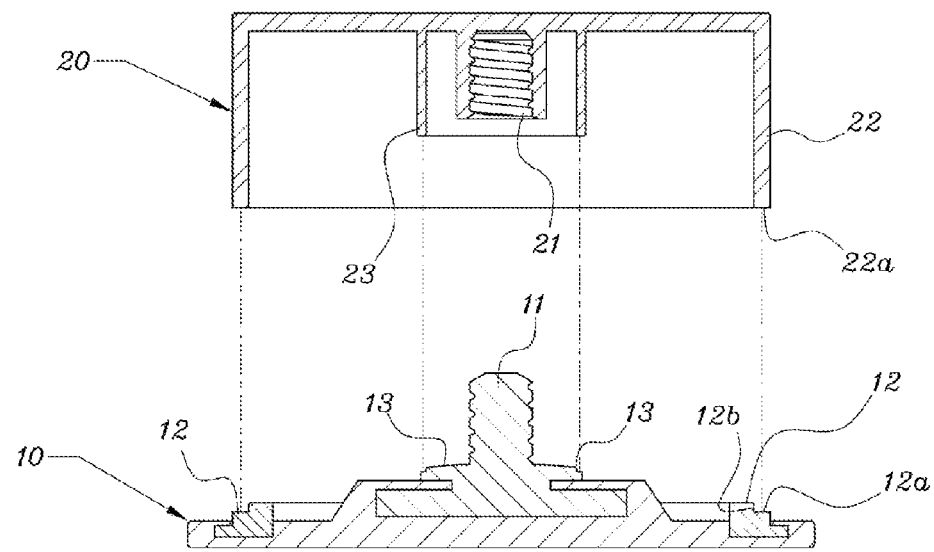
FIG. 4 shows the separated perspective view of FIG. 3.

As shown in FIGS. 3 and 4, the rail-type vacuum fixer based on the present invention consists of the suction plate (10) and the rotary cap (20).

First of all, the said suction plate (10) is made of a flexible soft material, and the bottom surface sealed to the attached surface has a flat structure. At the center of the top surface for the said suction plate (10), the screw bar (11) is installed in the vertical direction. In the outer area of the top surface, the rotary rail (12) is installed in the circumferential direction.

The said rotary rail (12) is made of a solid hard material and has at least one gliding plane (12a) deployed on the cone with the screw bar (11) as a center. The desirable material of the said rotary rail (12) is a metal or a hard synthetic resin. The said gliding plane (12a) may have any structure as long as it can slide for movement. However, it is desired that it be made into a plane deployed in the horizontal direction. The cross section of the said gliding plane (12a) may be an inclined plane or a curved plane.

Though the said rotary rail (12) may be attached to the top surface of the suction plate (10), as shown in FIG. 4, it is desirable to have, by insert-molding the suction plate (10) together with the screw bar (11), a structure in which the bottom of the said gliding plane (12a) is buried into the suction plate (10), In any case, however, the said gliding plane (12a) should be always exposed over the suction plate (10).

An adhesive layer may be coated on the bottom surface of the said suction plate (10). The said adhesive layer is made of a sticky polyurethane resin, for example, and strengthens the suction force between the said suction plate (10) and the attached surface.

Next, the said rotary cap (20) covers the top surface of the said suction plate (10) and is made of a solid hard material. The said rotary rail (12) and the said rotary cap (20) may be made of the same material or different materials, but it is desirable to select the materials without a high friction force between them.

At the center of the inside of the said rotary cap (20), formed is the screw pipe (21) into which the said screw bar (11) is inserted, and in the border area, prepared is the sliding rim (22) corresponding to the said rotary rail (12). Thus, if the rotary cap (20) is covered on the suction plate (10) at the state that the bottom surface of the said suction plate (10) is sealed to the attached surface, the said screw bar (11) corresponds to the said screw pipe (21 and the said rotary rail (12) corresponds to the said sliding rim (22).

At this state, if the said rotary cap (20) is rotated, the bottom surface (22a) of the said sliding rim (22) slides along the gliding plane (12a) of the said rotary rail (12), and the said screw bar (11) rises into the said screw pipe (21). And, while the central area of the said suction plate (10) is forced to rise along the said screw bar (11), the vacuum chamber (C) is formed between the bottom surface of the suction plate (10) and the attached surface.

Figure 5:
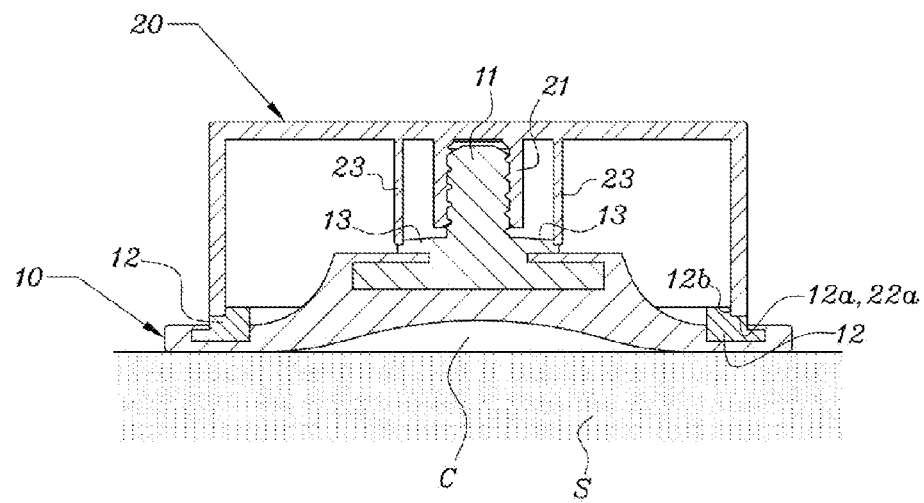
FIG. 5 shows the combined cross section of FIG. 3.

According to the Examples of the present invention, the said gliding plane (12a) forms a plane deployed in the horizontal direction, and prepared is the guide wall (12b) which makes a sliding contact with either of the inner and outer circumferential surfaces of the said sliding rim (22) on any side out of the inner or outer line of the said gliding plane (12a). Attached FIGS. 4 and 5 show the structure in which the guide wall is formed along the inner line of the said gliding plane (12a) and the said guide wall (12b) contacts with the inner circumferential surface of the said sliding rim (22). The said guide wall (12b) guides the said rotary cap (20) so that the bottom surface (22a) of the said sliding rim (22) may not break away from the said gliding plane (12b) when the said rotary cap (20) rotates.

The said rotary rail (12), the characteristic of the present invention, smoothen the rotation of the said sliding rim (22) to help the said screw bar (11) to rise smoothly. And, the air-tightness of the vacuum chamber (C) is eventually improved by supporting the border area of the suction plate (10) and preventing the deformation of the suction plate (10) when the said screw bar (11) rises.

In addition, the said rotary rail (12) also improves the suction endurance by dispersing the load imposed on the said suction plate (10). In general, the vacuum fixer is attached on the attached surface (S) arranged in the vertical direction, and it is used mainly in hanging such a household item as a soap case. Thus, most of the load is imposed upon the said suction plate (10) in the gravity direction, and when the suction plate (10) falls off the attached surface (S), the upper part mostly falls first. This work-direction load eventually causes the suction endurance of the vacuum fixer to decline.

In the present invention, however, since the said rotary rail (12) supports the border area of the said suction plate (10) and disperses the work-direction load imposed upon the said suction plate (10) into its entire area, the suction endurance is eventually improved.

Besides, as shown in FIG. 5, since the width of the said rotary rail (12) is larger than the thickness of the sliding rim (22), the border area of the said suction plate (10) increases the load-imposed area of the attached surface (S), which contributes to improvement of the air-tightness of the vacuum chamber (C).

Meanwhile, in the present invention, No. 1 stopper is installed on the top surface of the said suction plate (10), and No. 2 stopper, which limits the rotation of the said rotary cap (20) in combination with the said No. 1 stopper, may be installed inside the said rotary cap (20). These stoppers make users recognize that a sufficient size of the vacuum chamber (C) should be secured inside the suction plate (10). Thus, its use is convenient since when the vacuum fixer is attached on the attached surface (S), the rotary cap (20) should be rotated only until the said No. 1 and No. 2 stoppers are combined.

Figure 6:
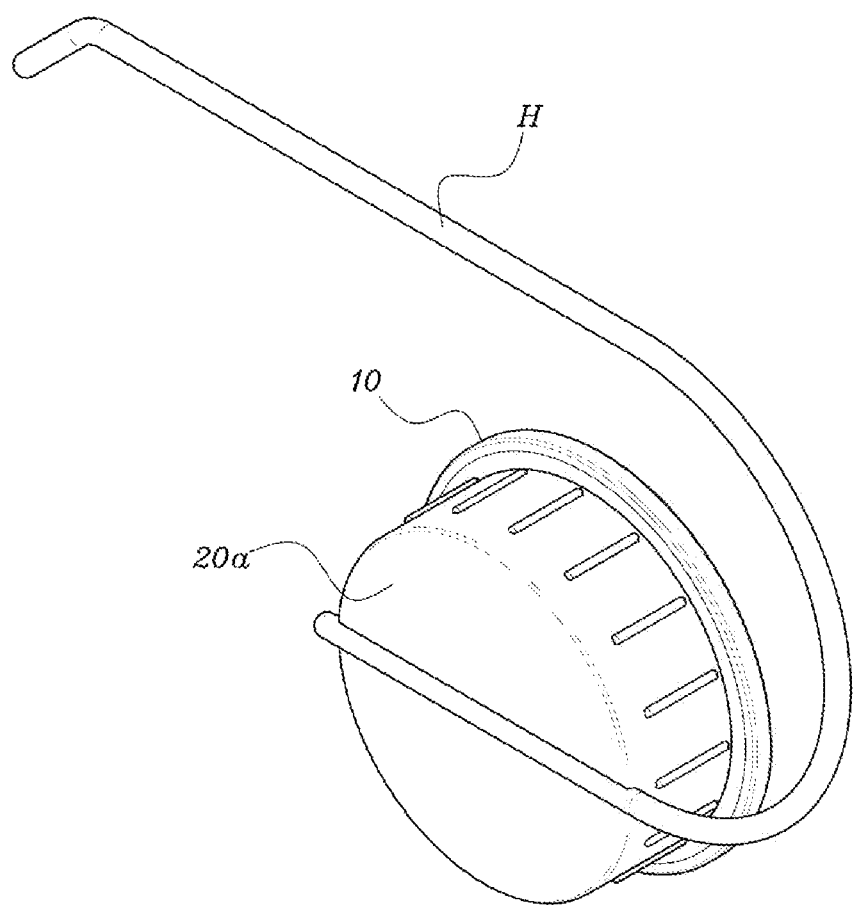
FIG. 6 shows a case of application for the rail-type vacuum fixer based on the present invention.

In addition, the said stoppers stop the said rotary cap (20) at the position where the rotational angle of the rotary cap is always constant. In FIGS. 3 through 5 of the present invention, for convenience, no components are added on the rotary cap (20). In consideration of the use of the vacuum fixer, however, such various components as a towel hook, handle, pipe support, and case support are installed on the said rotary cap (20), depending on the use. Attached FIG. 6 is an Example of the present invention, showing the structure in which a towel bar is installed on the top surface of the rotary cap (20a). Thus, it is very useful to stop the rotary cap (20) at its certain angle when the suction plate (10) secures a sufficient suction force.

Any structure of the said stoppers is acceptable as long as it accomplishes the objective of the present invention. Attached FIG. 3 is an Example of the present invention, showing the structure in which the said No. 1 stopper is the rectangular protruded part (13) protruded around the said screw bar (11), and the said No. 2 stopper is the rectangular pipe (23) protruded around the said screw pipe (21) and combined with the rectangular protruded part (13) at the bottom end. The said rectangular protruded part (13) and the said rectangular pipe (23) may have even a pentagonal or hexagonal structure.

Finally, since the rail-type vacuum fixer based on the present invention has no component corresponding to the fastener of the three-piece type, it is effective in changing the external shape and structure of the rotary cap (20). For example, it is possible to construct the external shape of the said rotary cap (20) in such various forms as a rectangle, star, heart, animal head, and flower and it is also possible to fabricate the vacuum fixer with a especially short and flat structure. The possibility of changing the external shape and structure of the said rotary cap (20) in a variety of ways means the possibility of expanding the utilization scope of the vacuum fixer depending on the various requests of consumers.

[Description of Signs]

| | |
|---|---|
| 10; Suction Plate | 11; Screw Bar |
| 12; Rotary Rail | 12a; Gliding Plane |
| 12b; Guide Wall | 13; Rectangular Protruded Part |
| 20, 20a; Rotary Cap | 21; Screw Pipe |
| 22, 22a; Sliding Rim | 23; Rectangular Pipe |
| C; Vacuum Chamber | H; Towel Bar |
| S; Attached Surface | |

What is claimed is:

1. A rail-type vacuum fixer, comprising:
   a soft suction plate having a screw bar installed at a center of a top surface, a hard rotary rail installed in a circumferential direction in an outer area of the top surface, and a No. 1 stopper installed on the top surface; and
   a hard rotary cap, which covers the top surface of the said suction plate, has a screw pipe formed at a center inside for insertion of the said screw bar, a sliding rim corresponding to the said rotary rail prepared in a border area, and a No. 2 stopper installed inside;
   wherein the said rotary rail is equipped with at least one gliding plane deployed as a plane on a screw bar centered circumference on the top surface of the said rotary rail,
   if the said rotary cap is rotated, while a bottom surface of the said sliding rim slides along the said gliding plane, the said screw bar rises into the said screw pipe, and
   the said No. 2 stopper limits the rotation of the said rotary cap in combination with the said No. 1 stopper by contacting the said No. 1 stopper.

2. The rail-type vacuum fixer according to claim 1, wherein an adhesive layer is coated partly or entirely on a bottom surface of the said suction plate.

3. The rail-type vacuum fixer according to claim 1, wherein, on the said rotary rail, a bottom of the said gliding plane is buried into the said suction plate.

4. The rail-type vacuum fixer according to claim 1, wherein the said gliding plane forms a plane deployed in a horizontal direction, and is installed a guide wall which makes a sliding contact with either of an inner or an outer circumferential surfaces of the said sliding rim on either of an inner or an outer line of the said gliding plane.

5. The rail-type vacuum fixer according to claim 3, wherein the said gliding plane forms a plane deployed in a horizontal direction, and is installed a guide wall which makes a sliding contact with either of an inner and outer circumferential surfaces of the said sliding rim on either of an inner or an outer line of the said gliding plane.

6. The rail-type vacuum fixer according to claim 1, wherein the said No. 1 stopper is a rectangular protruded part protruded around the said screw bar, and the said No. 2 stopper is a rectangular pipe protruded around the said screw pipe and combined with the rectangular protruded part at a bottom end.

7. The rail-type vacuum fixer according to claim 2, wherein the said No. 1 stopper is a rectangular protruded part protruded around the said screw bar, and the said No. 2 stopper is a rectangular pipe protruded around the said screw pipe and combined with the rectangular protruded part at a bottom end.

8. The rail-type vacuum fixer according to claim 1, wherein the rail-type vacuum fixer is comprised of two assembled pieces, the soft suction plate including the screw bar, the hard rotary rail, and the No. 1 stopper being a first assembled piece of the rail-type vacuum fixer and the hard rotary cap including the screw pipe, the sliding rim, and the No. 2 stopper being a second assembled piece of the rail-type vacuum fixer.

* * * * *